W. J. FOOTITT.
BAND CUTTER AND FEEDER.
APPLICATION FILED FEB. 12, 1907.
902,391.
Patented Oct. 27, 1908.
2 SHEETS—SHEET 2.
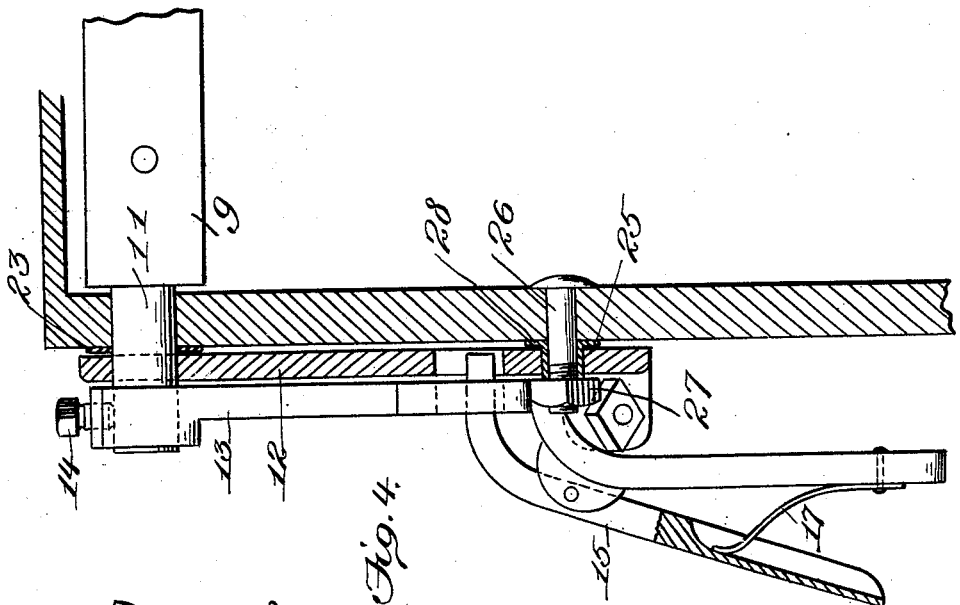
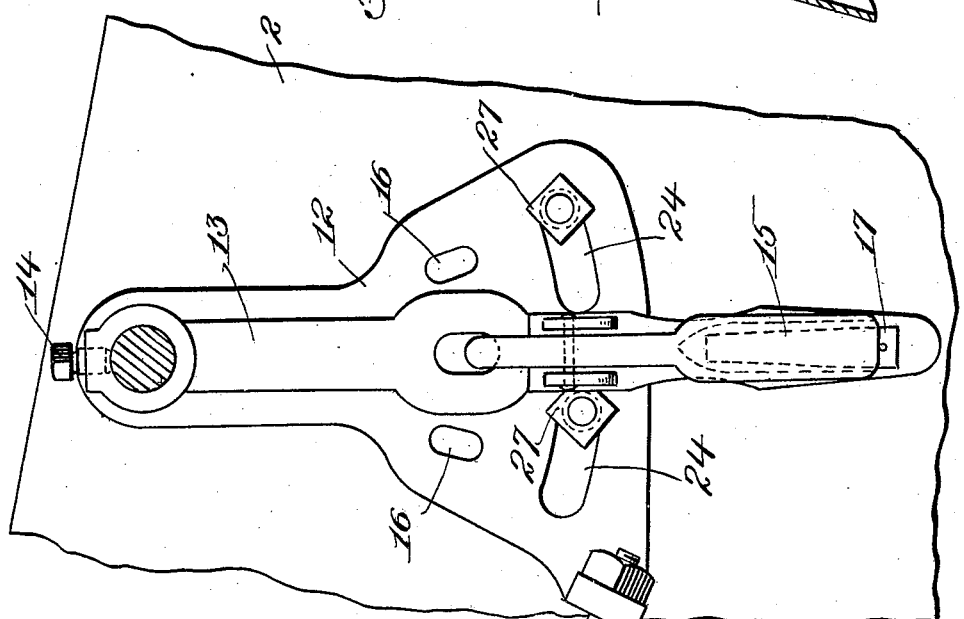
Witnesses:
C. D. Kesler
L. D. Kesler
Inventor
William J. Footitt.
By James L. Norris.
Atty

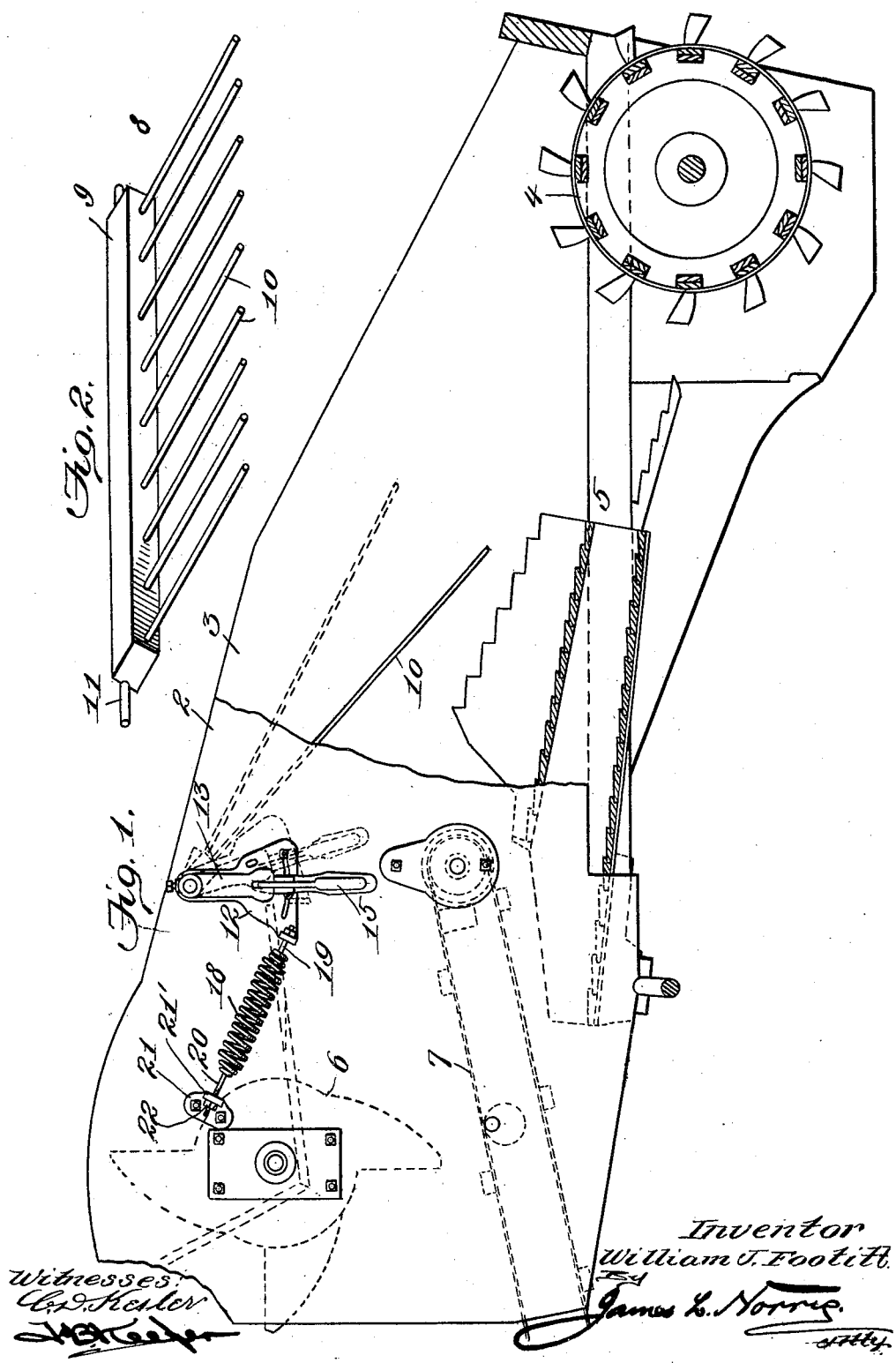

UNITED STATES PATENT OFFICE.

WILLIAM J. FOOTITT, OF CARRINGTON, NORTH DAKOTA, ASSIGNOR TO ADVANCE THRESHER CO., OF BATTLE CREEK, MICHIGAN, A CORPORATION OF MICHIGAN.

BAND-CUTTER AND FEEDER.

No. 902,391.  Specification of Letters Patent.  Patented Oct. 27, 1908.

Application filed February 12, 1907. Serial No. 357,109.

*To all whom it may concern:*

Be it known that I, WILLIAM J. FOOTITT, a citizen of the United States, residing at Carrington, in the county of Foster and State of North Dakota, have invented new and useful Improvements in Band-Cutters and Feeders, of which the following is a specification.

This invention relates to band cutters and feeders and more especially to a means for controlling the amount of straw which a feeder will deliver to the cylinder of a separator and thus prevent slugging, the object being to provide effective mechanism of the character set forth which can be easily adjusted to meet different conditions and which can be firmly maintained in the several adjusted relations.

In the drawings accompanying and forming a part of this specification I show in detail one form of embodiment of the invention which to enable those skilled in the art to practice said invention will be fully set forth in the following description, while the novelty of said invention will be included in the claims succeeding said description.

Referring to said drawings, Figure 1 is a sectional side elevation of a portion of a threshing machine constructed in accordance with my invention and with a part of the casing thereof removed. Fig. 2 is a perspective view of the regulator. Fig. 3 is a side elevation on an enlarged scale of the adjusting and holding means for said regulator and part of a spring, and Fig. 4 is a vertical sectional view of the part shown in and on the same scale as Fig. 3.

Like characters refer to like parts throughout the several figures.

In Fig. 1 of the drawings I have shown certain of the working parts of a threshing machine and these are ordinarily inclosed in a casing which may consist of suitably connected side walls 2 and 3. In said casing is a cylinder as 4, a feeder as 5, a band cutter as 6 and a feed belt or raddle as 7. The feed belt 7 is located under the band cutter and delivers the cut straw to the feeder 5 which in turn feeds it to the cylinder 4. These parts may be and preferably are of the usual construction and operation, for which reason it is needless to go into detail as to these points. It will be obvious, however, that I may employ my regulating mechanism with any type of thresher.

The regulating mechanism involves a regulator as that denoted in a general way by 8 and which consists preferably of an oscillatory gate. This gate is ordinarily composed of a wooden body 9 and metallic teeth as 10. The teeth may be of any desired number and when the gate is in working position said teeth point toward the cylinder 4. The wooden body 9 is fastened to a shaft as 11 in some suitable way and this shaft is supported for rocking motion by the side walls 2 and 3, said side walls in the present case being perforated for the passage of the opposite end portions of said shaft. One end of the shaft 11 or that illustrated in the foreground in Fig. 1 extends freely through the head of the plate 12. From this it will be evident that the shaft which constitutes a suitable pivot for the regulator or flood gate 8 is oscillatory with respect to said plate 12. I deem it desirable at this point to state that I use the term plate as well as the other terms employed in the present specification in their generic senses.

I have shown as fastened to the extreme outer end of the shaft 11 which appears in the foreground in Fig. 1, a hand lever 13, said hand lever having a hub at its upper end to receive said shaft end and the two may be normally rigidly connected together in any desirable way, for example, by means of a set screw as 14 tapped through the hub and adapted to engage said shaft so that when the hand lever 13 is swung the shaft 11 and hence the regulator or flood gate 8 can be angularly adjusted. The hand lever 13 is represented as pivotally supporting a detent as 15, the upper or working end of which is adapted to engage one of several holes or slots as 16 in the plate 12. There may be any number of these holes or slots, three being shown, and in Fig. 3 the upper or working end of the detent 15 is located in the middle of one of said holes or slots and is maintained in such relation by a spring as 17 fastened to the hand lever 13 by a pin or otherwise. The detent 15 is shown as being of lever form and the free end of the spring bears against the lower arm of the detent to hold the upper end of the upper arm in one of the several slots 16. By pressing the lower branch of the detent 15 inward, the working end of the detent can be carried out of the middle hole or slot which it is shown as occupying in Fig. 3 to permit the lever to be swung over either to the right or to the left in Fig. 1 and when the desired adjustment is obtained, the detent 15 will be released so that the spring 17 then under tension can thrust the working end of said detent either into the slot or hole 16 on the left or the slot or hole 16 in the right in accordance with the direction which the said lever may have been moved. When the detent 15 is in its operative position it rigidly connects the lever 13 and plate 12 so that they are in effect a unitary structure. When the detent, however, is disengaged from the plate the lever can be manipulated to adjust the angular position of the regulator 8.

The regulator 8 is preferably yieldingly mounted in place and for this purpose a coiled spring as 18 will be preferably employed, said spring having the rods 19 and 20 extending outwardly from opposite ends thereof, said rods being rigidly connected or integral with the terminal whirls of said spring. The rod 19 is suitably connected with the plate 12 while the rod 20 extends through an ear or lug 21' projecting outward from a bracket as 21 attached to the outside of the wall 2. The rod 20 is exteriorly threaded to receive the nut 22 which fits against the rear face of the lug 21' and by turning this nut the tension of the spring 18 can be regulated.

In Fig. 1 I have shown the regulator 8 in full lines as occupying its intermediate adjusted position. The detent 15 on the hand lever 13 at this time being entered in the intermediate hole 16 so as to rigidly connect the hand lever 13 and plate 12. The teeth 10 of the regulator extend at a downward and forward angle from the head 9 of the said regulator and over the feeder 5 so as to hold back the straw should there be an excessive supply thereof, by reason of which said straw cannot be presented in undue sufficiency to the cylinder 4. Should there be any obstructions in the mass striking against the teeth 10 of the regulator, said teeth will not be broken or bent, but the regulator as a whole will be swung upwardly thereby stretching the spring 18 through the intermediate parts and when the excessive pressure has been removed from the regulator the spring by relaxing will return the parts to their original positions.

It will be understood that the plate 12 swings contiguous to the wall 2. The plate, however, is not in contact with said wall. Surrounding the shaft 11 between the head of the plate and the wall 2 is a washer 23 which spaces the upper part of said plate from the wall 2. In the lower and widened portion of the plate are shown two segmental openings 24 and through the same respectively pass bushings as 25 (see Figs. 3 and 4), the length of the bushings exceeding the depth of the plate 12, by reason of which the opposite ends of the said bushings can extend outwardly beyond the inner and outer faces of said plate. Through the bushings 25 are passed bolts as 26 receiving at their outer threaded ends, nuts as 27, the shanks of the bolts passing through perforations in the wall 2 and the heads of said bolts being against the inner face of said wall. Around the bolts 26 are washers as 28 which are interposed between the inner ends of the bushings or sleeves 25 and the outer face of the wall 2. When the nuts 25 are set up they bind against the bushings 25 and the latter in turn are forced solidly against the washers 28. This holds the parts in assembled relation and although such described construction serves to maintain the lower portion of the plate 12 away from the wall 2, the swinging movement of the plate is in nowise affected.

When the plate 12 is in a retracted position as shown for example in Fig. 3 the bushings or sleeves 25 will be against the right end walls of the two slots 24 and the plate can therefore swing to the right from the position it is shown as occupying in Fig. 3 until the left ends of said two slots 24 strike the normally stationary bushings or sleeves 25. The bolts 26, therefore, act as stops to limit the swing of the plate 12. Under normal conditions when the regulator 8 is elevated by a mass of straw the plate is swung therewith as will be understood. By disengaging the detent 15 from the plate 12 the lever 13 can be operated to adjust the regulator, for example, from the full line position in Fig. 1 to the dotted line position in said figure. In this view I have also illustrated by full and dotted lines the two positions of the lever 13. When the angular position of the regulator is varied the plate 12 is not moved.

From the foregoing description it will be evident that I provide an adjustable gate which is automatic in its different positions. The tension of the spring which yieldingly maintains said gate in its operative position may be readily regulated so as to adjust the pressure of the gate on the bundle. The gate is located over the feeding mechanism and the bundle of straw is between the two parts and the gate prevents the feeding mechanism from throwing too large a quantity of straw onto the cylinder.

What I claim is:

1. In a machine of the class described, the combination of a casing, an oscillatory plate having segmental slots, bushings fitted in said slots and extending outwardly beyond the outer and rear faces of the plate, bolts extending through the casing and bushings, nuts on the bolts to engage the outer ends of the bushings, a regulator, means for adjustably connecting the regulator with said plate, and a spring acting against said plate.

2. In a machine of the class described, the combination of a cylinder, a feeder for supplying material to the cylinder, a regulator coöperative with and adapted to regulate the supply of material to the feeder, a plate coöperative with and oscillatory relatively to the regulator, a hand-lever rigidly connected with the regulator, a detent supported by the hand-lever to engage the plate at different places to effect the angular adjustment of said regulator, and a spring acting against the plate to maintain the regulator yieldingly in its working position.

3. In a machine of the class described, the combination of a cylinder, a feeder for supplying material to the cylinder, an oscillatory regulator having a shaft to turn therewith, said regulator being adapted to regulate the supply of material to the feeder, a plate loosely supported by said shaft, a hand-lever rigidly connected with the shaft to swing the regulator, a detent supported by the hand-lever to engage the plate at different places to hold the regulator in its different angular adjusted positions, and a spring acting against the plate to yieldingly hold said regulator in its operative position.

4. In a machine of the class described, the combination of a cylinder, a feeder for supplying material to the cylinder, a regulator coöperative with and adapted to regulate the supply of material to the feeder, a plate coöperative with and oscillatory relatively to the regulator, a hand-lever rigidly connected with the regulator, a spring-actuated latch supported by the hand-lever, the plate having several slots or openings to receive the working portion of said detent, and the hand-lever being slotted for the passage of said detent, and a spring acting against the plate to hold the regulator in its different adjusted positions.

In testimony whereof I have hereunto set my hand in presence of two subscribing witnesses.

WILLIAM J. FOOTITT.

Witnesses:
  THOMAS BUCHANAN,
  C. W. BURNHAM.